June 11, 1963 R. B. MESROBIAN ETAL 3,093,255
METHOD OF PREPARING MIXTURES OF HYDROCARBON POLYMER RESINS
AND LINEAR POLYAMIDE RESINS AND PRODUCT THEREOF
Filed Aug. 28, 1958

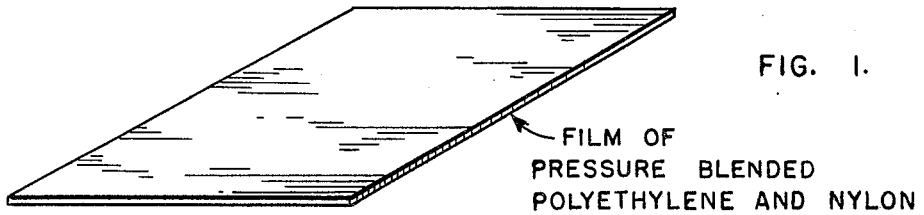

FIG. 1.

FILM OF
PRESSURE BLENDED
POLYETHYLENE AND NYLON

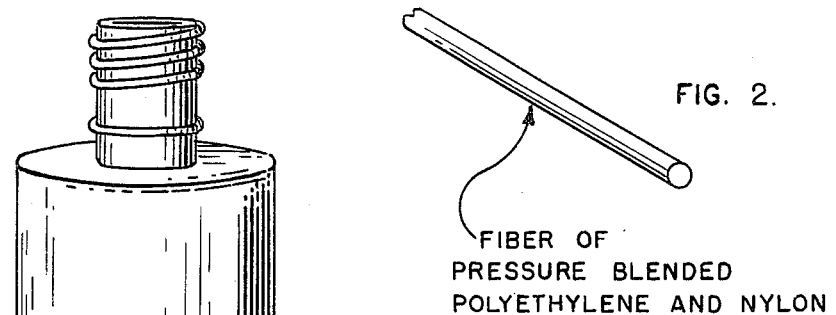

FIG. 2.

FIBER OF
PRESSURE BLENDED
POLYETHYLENE AND NYLON

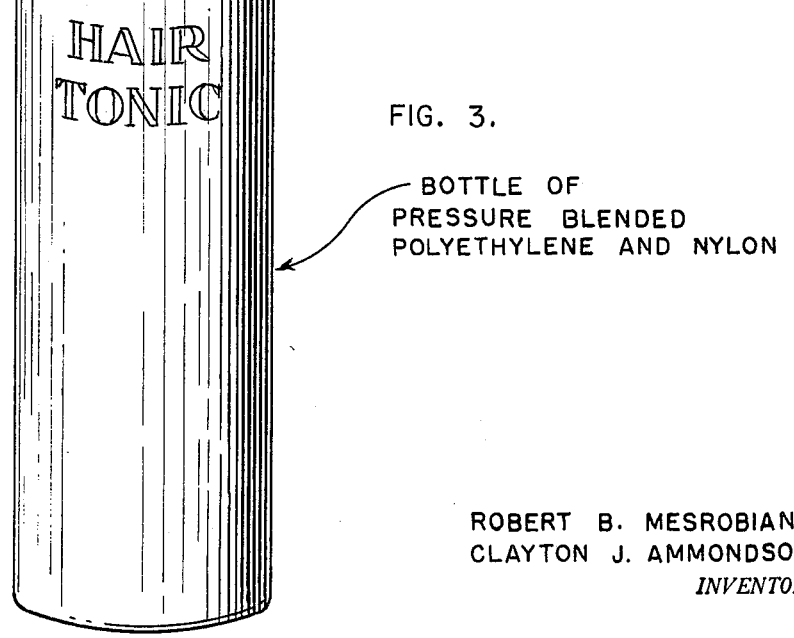

FIG. 3.

BOTTLE OF
PRESSURE BLENDED
POLYETHYLENE AND NYLON

ROBERT B. MESROBIAN
CLAYTON J. AMMONDSON
*INVENTORS*

BY

Mason, Porter, Diller & Stewart,
*ATTORNEYS*

United States Patent Office 3,093,255
Patented June 11, 1963

3,093,255
METHOD OF PREPARING MIXTURES OF HYDROCARBON POLYMER RESINS AND LINEAR POLYAMIDE RESINS AND PRODUCT THEREOF
Robert B. Mesrobian, Hinsdale, and Clayton J. Ammondson, Tinley Park, Ill., assignors to Continental Can Company, Inc., New York, N.Y., a corporation of New York
Filed Aug. 28, 1958, Ser. No. 758,175
15 Claims. (Cl. 215—1)

This invention relates to a process of preparing an organic plastic material, and to a composition and articles produced thereby and characterized by resistance to permeation by fluids, and by printability.

The use of synthetic organic resins, in the form of films, fibers, sheets, laminates, bottles and other containers, for the packaging of such items as foodstuffs, cosmetic preparations, deodorants, hair preparations, medicinal preparations, industrial supplies, oils, and the like, has become widely popular. In particular, polyethylene is widely used in the production of wrapping films, bottles and containers for packaging because it is relatively inert, is tough and flexible, has a low moisture permeability and can be easily fabricated in quantity at a reasonable cost. However, polyethylene and other synthetic hydrocarbon resins which are useable for films, bottles and containers are permeable to many organic liquids, including a large number of conventional organic solvents which are widely used in the formulation of preparations for which polyethylene films or bottles are highly desirable. Representative chemicals, for example, which permeate with various degrees of rapidity through polyethylene at room temperature, include the straight chain hydrocarbons, the aromatic hydrocarbons, esters, ketones, and other similar materials; consequently, the use of polyethylene and other low cost and easily processable hydrocarbon resins has been restricted to those products to which the resin is substantially impermeable. However, in special cases the expensive and time consuming technique is employed of coating polyethylene with a layer of a polymeric material which is impermeable to the product. Coating materials which have been used include polyvinyl alcohol, polyvinyl chloride, copolymers of vinylidene chloride and other monomers, polyamides and epoxide resins. The coatings are usually applied on the side of the film, bottle or container which is next to the product being packaged. This involves pretreating the inside of the bottle or container with one of the pretreating methods known to those skilled in the art such as flaming, electrical discharge, ionizing radiation, chlorination or chemical oxidation. This procedure is required due to the low degree of adhesion obtained by inks and coatings on untreated polyethylene surfaces. Then the coating is applied by spraying or by slush coating with a solution or premix of the desired material. The coated article is then subjected to a curing temperature for a period of time necessary to produce the desired chemical reaction or removal of solvents. If the polyethylene film, bottle or container is to be printed or decorated, the outside of the article must also be pretreated by one of the abovementioned methods before application of inks, decorative coatings, or overprint varnishes. By way of contrast with polyethylene, the polyamides of the nylon types maintain good fluid permeability resistance to the various organic liquids cited above, and additionally nylon films and containers are readily printed and decorated without the requirement of surface treatment. Thus, while nylon and polyethylene are regarded as incompatible; and have dissimilar properties, it would be of advantage if the desirable behavior of each could be incorporated into a product which would make the product more satisfactory than either alone. Proposals have been made to attain such results by a procedure called "telomerization" in the Hanford Patents 2,542,771, 2,405,950 and others, and the Howk et al. Patent 2,409,603. These procedures involve the preparation of a polyamide or nylon, and then subjecting it under heat and pressure to the action of gaseous ethylene, usually in the presence of a catalyst which promotes the attachment of ethylene groups onto the nylon molecule. Such operations require major equipment and careful controlling; and the product is a polyamide which apparently has discrete ethylene branch substitutions along the molecular chain.

The terms "nylon" and "polyamide" are employed herein to designate water insoluble polycarbonamides which have recurring amide groups as integral parts of the polymer chain. Commercial nylon is prepared by several types of operations, each of which leads to a molecular structure having amide links and hydrocarbon links along the chain. In one process a cyclic ketone is prepared (e.g. phenol is hydrogenated to cyclohexanol, and this in turn is converted to cyclo hexanone), which by reaction with nitrogen containing compounds is converted to a seven-membered ring, for example epsilon amino caprolactam, which is polymerized to form the long chain polymer (this polymer product is known commercially as Nylon 6). In another process, a dibasic organic acid (e.g. adipic or sebacic) is treated with a diamine (e.g. hexamethylenediamine) to form a long chain polymer with concurrent removal of water (this polymer product is known commercially as Nylon 66). In both cases cited above it is recognized that the preparations of polymers of molecular weights greater than about 20,000 presents difficulties inherent to these types of condensation reactions. By way of contrast, polyethylenes of molecular weights greatly in excess of 20,000 are readily preparable. The number of connected carbon atoms between successive amide groups in nylon materials depends upon the starting compounds: in the above examples there are six carbon atoms, but nylons have been prepared with other carbon numbers between the amide groups (e.g. ten).

Such a polyamide or nylon can be defined as a water-insoluble fiber-forming synthetic polymeric carbonamide which contains recurring carbonamide groups as an integral part of the main polymer chain separated by at least two carbon atoms.

Such a linear polyamide or nylon has a specific gravity greater than unity, for example around 1.1; with good permeability resistance to organic liquids including greases, hydrocarbon oils, essential oils, aliphatic and aromatic solvents, higher alcohols, esters, ethers, and ketones; high tensile strength compared to polyethylene; and acceptance of the inks commercially employed for printing on organic plastics. However, nylons are permeable to the lower alcohols, water and their vapors; and exhibit dimensional instability in moist atmospheres. Nylon 6 melts at about 430 degrees F., and can only be extruded within a narrow range of temperature above its melting point, noting that this range is very narrow and close temperature control is necessary for obtaining proper viscosity for regularized extrusion. This narrow range complicates blowing bottles thereto from tubing by the simple procedures employed with polyethylene. In addition, nylon tends to become yellow at extrusion temperatures, particularly if exposed to the air incidental to the extrusion. Nylon is three or four times as expensive, in the present market, as polyethylene; due to the necessity of several successive chemical conversion stages and purifications. A characteristic of nylon polymer is that its degree of crystallinity at room temperature is greatly dependent upon such factors as degree of orientation or stretching, rate of cooling from the melt and annealing conditions, whereas polyethylenes on cooling from the melt temperature to room temperature generally crystallize to an extent mainly dependent upon their chemical structure rather than orientation or annealing conditions. Additionally, whereas the permeability of polyethylene to organic liquids is dependent upon crystallinity content or density of polyethylene (as determined by its structure, i.e., linear versus branched), the permeability of Nylon 6 and Nylon 66 is found to be acceptable even at the lowest degrees of crystallinity. Thus, it is generally presumed that the low permeability of nylon is attributable to its chemical composition rather than its degree of crystallization.

Polyamides are expensive; they must be completely dry before molding or extrusion, and oxidize readily during molding or extrusion so that reprocessing of scrap material presents a problem of discoloration and decrease in physical properties. Aerosol bottles require strength to resist the internal pressure, and linear polyamide would make a satisfactory material for many uses; but the difficulties of blow-molding, or other cheap production, limits its utility.

Polyethylene can be prepared by several processes, known in the art. By one procedure, a product having a specific gravity of around 0.92 is obtained, and is often referred to as "regular branched chain polyethylene," being available commercially under several trademarks, one of which is DYNI. X-ray examination indicates that such commercial products include crystalline components of about 50–55 percent. Noting the similarity of chemical structures, such polyethylenes permit permeation by hexane; and this easily occurs at low percentages of crystalline component, but decreases as the crystalline component increases. For example, a standard four-once bottle of regular branched polyethylene (50% crystallization) may exhibit a permeation by heptane, under standard test conditions, equal to a loss of over 40 times the internal capacity of a container per year. Also, it is permeable to essential oils; and under a like test with methyl salicylate, that is, oil of wintergreen, the loss can represent over 100 percent per year. The melting range of this polyethylene begins with significant softening at around 105 to 110 degrees C. (220 to 230 degrees F.): extrusion operations are conducted at around 300 to 500 degrees F., because the viscosity has a slow rate of change with temperature, with little or no degradation during heating and extrusion.

Another procedure, for example, as in the Pease and Roedel Patent 2,762,791, produces a so-called linear polyethylene which in commercially available form can have a density around 0.95 and 0.96. These commercial products exhibit crystalline components of 70 to 85 percent with a corresponding reduction of permeability to heptane or methyl salicylate; for example, the loss of heptane by the above test may be at the rate of over 350 percent per year, and of methyl salicylate around 20–25 percent per year.

Both general types of polyethylene are relatively inexpensive, are resistive to permeation by water and alcohol, are dimensionally stable, and are easily fabricatable for packaging uses). However, they have the disadvantage of poor printability in the untreated state, poor adhesions to coatings and inks, and high permeability to organic liquids other than the lower alcohols, as shown by the above comparative figures.

The great differences in permeation of polyethylene and nylon are accompanied by like differences in solubilities; and incompatibilities of such solutions do not permit the making of mixtures by dissolution, mixing, and evaporation of the solvent, entirely disregarding the costs of such operations. Polyethylene and nylon differ widely in cohesive energy density, which is an accepted basis for assuming incompatibility. In tests made by extruding films in a one-inch extruder under usual extrusion pressures of up to 250 pounds per square inch, from various mixtures of pellets of polyethylene and nylon, the products were found to reveal the high incompatibility of the components, by streaks, fish eyes and separate areas occupied by the individual components: and in tests of extruding tubes thereof and blowing in molds under the normal conditions for the types of polyethylene used, the resulting bottles were obviously composed of incompatible component resins, as evidenced by the ease of delamination upon squeezing, and the easy breakage and tearing.

It has been found however that when the materials are heated to fusion and subjected to shearing conditions under a pressure gradient, the resultant product has virtues not possessed by the ingredients: and it appears that some type of molecular rearrangement may be occurring; for example, by a mechanical shearing of one molecule by another with a subsequent reunion into a different form. In practice, it has been found that when the nylon component, in percentage by weight, approximates the percentage by weight of the non-crystalline or amorphous content of the polyethylene, the permeability factor of the polyethylene is reduced to that of the pure nylon or lower.

What has been stated concerning polyethylene applies also to isotactic polypropylene, a hydrocarbon polymer commercially available in the density range of about 0.85 to 0.92 and of semi-crystalline nature. Isotactic polypropylene has a mechanical strength and fluid permeability properties closely the same as polyethylene. This permeability can be reduced by incorporation of nylon.

An object of the invention is a process of producing an article of organic plastic which is characterized by great resistance to permeation by a great variety of fluid materials which may come in contact therewith during the use of such article.

Another object of the invention is the preparation of a container, bottle, film, or fiber composed of organic plastic material which resists permeation by the fluids customarily brought into contact therewith.

A further object is to provide a container, e.g., a bottle or wrapping film, which can be produced from an organic plastic material by the well-known forming techniques of extrusion, pressure molding, blowing, and vacuum drawing, without requiring additional operations of pretreating, internal or external coating, and curing for developing a high resistance to permeation by the fluid material or component to be contained thereby.

A further object is to provide a container, such as a bottle or wrapping film, and fibers, which can be directly printed or decorated with use of commercially available inks and coatings, without requiring a pre-treatment of the surface by a flame, electrical discharge, halogenation, or oxidation.

An additional object of this invention is to produce an article wholly or in part of organic plastic such as a laminated structure having one or more layers of the instant composition adherent to a base carrier of metal foil, paper, paperboard and similar materials.

With these and other objects in view, illustrative articles made by the instant procedure are shown in the accompanying drawings, in which:

FIG. 1 is a perspective view of a piece of foil, on a greatly enlarged scale;

FIG. 2 is a perspective view of a short length of fiber, on a greatly enlarged scale;

FIG. 3 is an elevation of a bottle, on a reduced scale.

Such foils may be prepared in the widths and thicknesses commercially made of polyethylene and have been made on commercial equipment used for polyethylene: and can be employed like polyethylene and other foils for wrappings. The fibers can be of the denier sizes produced in extruding polymers such as polyvinylidene chloride. The bottles can be of any size such as the ounce, 2 ounce, 4 ounce, 8 ounce or larger and may be squeeze, semi rigid or rigid bottles now made of polyethylene: and have been produced on the same equipment: the illustrative form shows that printing can be readily effected thereon, as described hereinafter.

The process of this invention can be practiced by mixing pellets of polyethylene and nylon, heating with minimum exposure to air and oxygen to a temperature at which the nylon has been thermally softened or melted, subjecting the mass to a pressure in excess of 500 pounds per square inch and effecting turbulence or interkneading of the components with concomitant high shearing action, and fabricating into a shape which is or can be converted to the desired article.

This has been done on laboratory and commercial extrusion machines of the type used in preparing polyethylene sheets and tubes, with employment of small outlet openings so that, at a given rate of material feed and machine operation, a high back pressure gradient is developed from the outlet orifice toward the inlet hopper. For continuous extrusion, such machines employ a screw for advancing the charge from the hopper through the heating zone to the outlet orifice: and it has been found that so-called mixing screws (e.g. Dulmage screw) are desirable to promote the turbulence and shearing action, in contrast with ordinary metering screws. The polyethylene and nylon components can be introduced in the usual commercial form of pellets, that is, fragments about $\frac{1}{16}$ to $\frac{1}{8}$ inch long and about $\frac{1}{16}$ inch diameter. These are weighed in making batches, and then tumbled together for uniformity of mixture, noting that at this stage the densities are so closely alike that there is no observable gravitational separation during tumbling or in the hopper.

EXAMPLE 1

For the purposes of determining if nylon and polyethylene can be intermixed under ordinary extrusion conditions, 85 parts by weight of regular branched polyethylene (0.92 density, 50% crystallinity), mixed with 15 parts by weight of Nylon 6, were extruded in a one-inch laboratory extruder having a 12:1 ratio metering-type screw, with a $\frac{9}{16}$ inch diameter round die held at 500 degrees F. In such extruders, the screw ratio refers to the relationship of the effective length of the screw in the barrel, to the internal diameter of the barrel bore: thus, this screw had an effective length of 12 inches in the barrel, which latter had a bore of one inch. The same temperature was maintained in the front zone of the extruder and during extrusion a pressure of about 250 p.s.i. (pounds per square inch) was developed immediately behind a rod-forming die. The extruded rod was cooled in water, granulated and dried. The polyethylene-nylon mixture was then re-extruded through the same extruder, the round die having been replaced by a flat film die having an opening 0.023 inch wide and 11 inches long. The film produced did not appear like either polyethylene or nylon, but rather as a mixture of both having streaks; the two materials were obviously incompatible. On stretching it was found that the materials had very little tensile strength and readily separated into strands. (The nylon used in the above experiment was Nylon 6 prepared by the above epsilon aminocaprolactam reaction.)

EXAMPLE 2

The same apparatus was employed as in Example 1; with a Dulmage mixing screw replacing the metering-type screw, and with a gate valve installed between the discharge end of the extruder barrel and the rod-forming die. Such Dulmage screws are illustrated in the Dulmage Patent 2,607,077. A Bourdon-type pressure gage and a thermo-couple were installed between the extruder barrel and the gate valve. With the valve completely open, during a run, the gage indicated a pressure of 250 p.s.i. The valve was slowly closed until a pressure reading of 1800 p.s.i. (the safe upper operating limit for this extruder) was attained; the speed of the screw drive was correspondingly increased to maintain the output flow essentially constant.

Materials extruded under these conditions were pelletized in the manner previously described and re-extruded in film form, using the same apparatus and conditions as described in Example 1, The products thus produced exhibited greatly improved appearance compared to that of Example 1. These film materials did not have the streaked or stranded effect, and the films appeared in fact to be composed of a homogenous material. In each case, the same polyethylene and Nylon 6 as in Example 1 were employed, with the proportions stated by weight:

(I) 95 parts of polyethylene, 5 parts of nylon;
(II) 85 parts of polyethylene, 15 parts of nylon;
(III) 80 parts of polyethylene, 20 parts of nylon;
(IV) 60 parts of polyethylene, 40 parts of nylon;
(V) 50 parts of polyethylene, 50 parts of nylon;
(VI) 20 parts of polyethylene, 80 parts of nylon;
(VII) 5 parts of polyethylene, 95 parts of nylon.

It was noted that increasing the extrusion pressure during the initial extrusion operation gave significantly improved results.

EXAMPLE 3

The above work of Example 2 was repeated, with a linear type of polyethylene of density 0.945, about 70 to 80% crystallinity, and Nylon 6, and gave similar results as the pressure during the initial extrusion operations was increased.

EXAMPLE 4

A polyethylene extrusion machine of commercial type, with a 4½ inch barrel with a 20:1 length ratio and a Dulmage screw was fitted with a valving mechanism, a pressure gage, and a 17 strand pelletizing die having $\frac{1}{16}$ inch openings. This extruder had a normal capacity of 300 to 400 pounds per hour when operated for normal pelletizing purposes: it was operated at about 200 pounds per hour during the work of this example, with slow closing of the valve so that a pressure reading of about 4500 p.s.i. (the maximum safe pressure of the machine) was maintained during the run, with corresponding increase of the screw speed to maintain the volume of delivery and the same residence time. Pellet mixtures as follows were employed, the parts being by weight:

(VIII) 70 parts polyethylene of 0.92 density, 30 parts Nylon 6;
(IX) 50 parts polyethylene of 0.92 density, 50 parts Nylon 6;
(X) 80 parts polyethylene of 0.945 density, 20 parts Nylon 6;
(XI) 40 parts polyethylene of 0.945 density, 60 parts Nylon 6;
(XII) 20 parts polyethylene of 0.945 density, 80 parts Nylon 6;
(XIII) 0 parts polyethylene of 0.945 density, 100 parts Nylon 6.

The resin strands were water-quenched, pelletized and dried in an oven at 180 degrees F. It was noted that while pure Nylon 6 (test XIII) discolored during extrusion and during the air drying, presumptively due to air oxidation at the high temperature, with development of a brown or yellow color, all other tests showed a high resistance to such discoloration.

The pellets from this primary blending-extrusion were then employed in a 1½ inch extruder set up for forming tubing from polyethylene, with a manually operated bottle-blow molding die, and a series of 4 oz. bottles were prepared with wall thicknesses of commercially employed ranges of 15–20 mils and 30–40 mils.

Some of these bottles were filled with heptane or methyl salicylate or methyl alcohol; sealed; and the weight losses measured at intervals, with like filled bottles of the pure polyethylenes for comparison. All were maintained at 102° F. and 50% relative humidity, a standard test condition; and the weight variation measured from time to time. After up to 33 days of measurement, the data were extrapolated to give the permeability loss per year. The results were:

*Table I*

AVERAGED PERCENT WEIGHT LOSS PER YEAR OF FILLED FOUR-OUNCE NYLON-POLYETHYLENE BOTTLES

| Test No. | Nylon 6 | Composition of Bottle, percent by weight | | Estimated amorphous content in polyethylene | Wall Thickness (mils) | Percent Weight loss per Yr. | | |
|---|---|---|---|---|---|---|---|---|
| | | Polyethylene (density 0.92) | Polyethylene (density 0.945) | | | n-Heptane | Methyl Salicylate | Methyl Alcohol |
| XIV | 0 | 100 | 0 | 50 | 15-20 | 5,680 | 166 | --- |
| XV | 0 | 100 | 0 | 50 | 30-40 | 2,900 | 96 | 14 |
| XVI | 30 | 70 | 0 | 50 | 15-20 | 910 | 26 | --- |
| XVII | 30 | 70 | 0 | 50 | 30-40 | 820 | 25 | --- |
| XVIII | 50 | 50 | 0 | 50 | 15-20 | 1.0 | 0.9 | --- |
| XIX | 50 | 50 | 0 | 50 | 30-40 | 0.4 | 0.7 | 22 |
| XX | 0 | 0 | 100 | 30 | 15-20 | 492 | 14.4 | --- |
| XXI | 0 | 0 | 100 | 30 | 30-40 | 218 | 6.7 | 3 |
| XXII | 20 | 0 | 80 | 30 | 15-20 | 53.4 | 0.45 | --- |
| XXIII | 20 | 0 | 80 | 30 | 30-40 | 10.4 | 0.23 | 1.6 |
| XXIV | 60 | 0 | 40 | 30 | 30-40 | 0.1 | 0.51 | --- |
| XXV | 80 | 0 | 20 | 30 | 30-40 | 7.6 | 0.5 | --- |
| XXVI | 25 | 35 | 40 | 40 | 30-40 | 1.3 | 0.1 | --- |

For comparison, the reported loss of methyl alcohol by a like bottle of pure Nylon 66, having a wall thickness of about 25 mils, was about 120% at 73° F. and 1094% at 120° F.

Some of the bottles showed a weight gain, indicating that the permeability inward of moisture vapor and other material was in excess of the outward permeation of the heptane etc.; unfilled bottles were used as controls, and by taring for the gain of unfilled bottles, the actual permeation value was found to be essentially zero. This may be compared with the greater outward permeation of heptane with a 100% polyethylene bottle, so that its walls collapse under the pressure differential.

EXAMPLE 5

Like operations to Example 4 can be performed, employing a linear polyethylene (e.g. that sold under the trademark "Marlex-50"), with a density of 0.96 and about 80 to 85% crystallinity, in lieu of the above polyethylenes. With this material, the quantity of linear polyamide, e.g. Nylon 6, can be as low as 10 or 15 percent. The compositions thus produced have exhibited essentially the same impermeability to heptane and methyl salicylate as obtained by use of 20 percent by weight of nylon with the polyethylene of 0.945 density (see Table I), therewith exhibiting the effect of coordination of the amount of nylon with the crystallinity of the polyhydrocarbon.

EXAMPLE 6

A three-component mixture of 30 parts each by weight of the regular branched polyethylene of 0.92 density (50% total crystallinity) and of linear polyethylene of 0.945 density (70% total crystallinity) and 40 parts by weight of Nylon 6, was prepared from commercial pellets, mixed by tumbling, extruded, formed into tubing, and blown to bottles as in Example 4. By computation, the crystallinity of the two polyethylenes, considered as a two-part blend was (50+70)÷2 or 60%; with non-crystalline components of 40%, closely corresponding to the 40 parts of nylon employed. The bottles exhibited excellent behavior upon visual inspection during flexing and squeezing tests; and had virtually zero permeability values toward heptane and methyl salicylate. Such bottles may be compared with test XXVI in Table I.

EXAMPLE 7

Bottles were prepared as in Example 4. Half of the peripheral area was masked, and the other half was subjected to the usual flame pre-treatment employed with polyethylene to activate the surface for printing. Both the activated and non-activated areas were then printed in the usual way for polyethylene bottles, with a commercial ink used through a silk screen. After baking to set the ink, pressure sensitive tape was employed (a normal test of ink adhesion) and it was found that the non-activated surface was comparable to the activated surface; indicating that no activation of the instant composition was necesary or even desirable. These printed nylon containing bottles (non-activated) were compared with printed, surface activated, pure polyethylene bottles and no significant differences in ink adhesion noted.

EXAMPLE 8

Bottles of polyethylene permit outward permeation by contents having fatty components; and bottles of either polyethylene or nylon permit inward diffusion of atmospheric oxygen, with resultant rancidity of the fat. It has been proposed to apply internal coatings to polyethylene bottles, of substances which are not permeable to oxygen or fats such as vinylidene polymers and copolymers (e.g. one of the vinylidene chloride copolymers sold commercially under the trademark Saran), but it is difficult, and costly, to produce satisfactory internal coatings thereof by filling and dumping, by spraying, etc.

However, Saran-like materials are relatively easily applied to the surface of the present materials. The present nylon-polyethylene systems are impermeable to fats and with an external Saran coating also act as an oxygen-barrier material. Such coating can also be applied to limit the movement of other contacting gases such as hydrogen, nitrogen, carbon dioxide, and water vapor.

EXAMPLE 9

Films of the blended material can be employed as wrappings, with the advantage of great resistance to water and the various organic solvents, fats, oils, etc.

EXAMPLE 10

Such films may be made very thin, and applied hot to backings of paper and fiber board, to form barriers against water, oil, greases and organic liquids. Such coated or laminate materials can be wound into container bodies such as drums and cans, and provided with ends of like materials, or stamped and shaped into boxes and other containers; preferably with the film of the instant material at the inside for contact with the contents.

EXAMPLE 11

In the above Examples 1 to 4, the blend was formed by an initial extrusion operation, and the pelletized product was then re-heated and re-extruded into a sheet or tubing. When the extrusion machine having a high barrel length:diameter ratio, and a Dulmage screw with high turbulence effect and high pressure effects along its length, is employed, it is feasible to introduce the mixture of pellets to the hopper, and proceed with the blending along the length of the screw, followed by delivery through a restricted outlet orifice for assuring the pressure effect, and thus directly produce a sheet, tubing or other article from the pellet mixture. Also, when the extrusion machine is coupled, on a commercial basis, to a bottle blowing machine, the tubing can be passed hot to the blowing machine, and thus highly impermeable, printable, squeeze-type and semi-rigid bottles prepared in the single course of operation.

EXAMPLE 12

The initial blending can be accomplished on a Banbury mill having facilities for developing a temperature of around 500 degrees F. in the mass, with exclusion of undesirable atmosphere such as air or oxygen. Commercially available Banbury mills have revolving blades which knead and shear a plastic material. A discharging chamber and a fluid pressure ram are employed for keeping the viscous plastic material in intimate contact with the blades. By increase of the fluid pressure at the ram, pressures on the plastic material can be increased, so that the material is being kneaded under conditions of 500 p.s.i. or higher. The mixed pellets are fed and the kneading and mixing begun as the polyethylene becomes softened by the heat; the pressure is increased to 500 p.s.i. and preferably above. The thoroughly kneaded and mixed composition is then worked into the desired form of article, likewise with protection against undesired oxidation effects. A nitrogen atmosphere can be employed for the operations.

EXAMPLE 13

The data in Table I include results obtained with compositions produced with high nylon contents, e.g. 60 and 80 weight percent. These materials differ in behavior from pure nylon in fabrication and performance. For example, pure Nylon 6 or Nylon 66 has a low melt viscosity value compared to polyethylene, and hence there is difficulty from the need of closely controlled and higher temperatures in blowing nylon bottles; whereas the compositions of Table I, with 20 or 40 weight percent of the polyhydrocarbon can be readily fabricated into bottles by blowing. Likewise, the instant composition acts under other fabrication procedures such as extrusion and pressmolding to yield satisfactory products without the high care needed with pure nylon. This applies also at lower weight percentages than those in Table I: for example, 5 weight percent of polyethylene can act to increase the melt viscosity value of the composition so that fabrication with the apparatus and controls for polyethylene is feasible. As low as 2 weight percent of high molecular weight polyethylene (e.g. of density 0.96) likewise confers this valuable fabrication property upon the nylon-blended composition.

Further, pure nylon requires the close control of temperature and oxygen-exposure conditions for assuring, at the lower part of the temperature bracket a sufficient plastic flow to permit fabrication and, at the higher part of the temperature bracket, absence or minimization of the discoloration by overheating and oxidation. The instant composition of Table I, and those with as low as 5 weight percent of polyethylene, are able to undergo corresponding fabrication without the discoloration.

This problem of discoloration of nylon upon heating, along with loss of original high strength, is particularly important when the trimmed or scrap material of one operation is to be reworked, of itself or in mixture with fresh stock, for a later extrusion or other fabrication. The instant composition can be employed under polyethylene processing conditions for extrusion of a tube and the blowing of bottles therefrom, with the trimmings being returned to the extrusion operation for the production of further tubing, without the high discoloration which results from extensive exposure of nylon to the temperatures necessary for the extrusion and blowing, and with ability to conduct the operations in air and with compressed air instead of employing an atmosphere of non-oxidizing gas and blowing by a like gas.

Such high-nylon compositions have a further advantage over pure nylon. Nylon 66, for example, has a high permeability to methyl alcohol, as shown in the previous disclosure, column 7, line 27. The inclusion of the polyhydrocarbon (e.g. polyethylene of density 0.92) provides a composition having a significantly lower permeability factor for methanol than pure nylon, and significantly lower permeability factors for heptane and methyl salicylate than the pure polyethylene.

Pigments and dyestuffs can be mixed with the particles preliminary to the kneading operation, when a colored product is desired.

X-ray studies of extruded thin films made from 100% polyethylene, from 100% nylon, from mixtures at various relative proportions, and from such mixtures prepared by the instant procedure, show that commercial 100% polyethylene manifests a characteristically high degree of crystallinity; while 100% nylon (unstretched) shows little crystallinity, noting that commercial operations of extruding nylon sheets or blow-molding bottles do not effect sufficient orientation to increase the crystallinity to a significant extent. Thus, plotting the diffracted intensity of X-rays, in units measured by a Geiger counter, as ordinates against the abscissa values of interplanar spacings in Angstrom units, gives a regular progression as the percentage of nylon is changed. The X-ray patterns with the mixtures show reduction of total crystallinity essentially proportional to the amount of non-crystalline nylon incorporated with the crystalline polyethylene: that is, the nylon acts, under such tests, as a simple diluent of the polyethylene. It can thus be theorized that the non-crystalline nylon or polyamide does not enter the domains or regions of crystalline polyethylene, but occupies regions at which non-crystalline components of the polyethylene are present with their lesser resistance to permeation. The reduction of permeability of the polyethylenes, with increase of crystalline component, as shown by the above tests, and the great effect of low amounts of polyamide or nylon in further restricting permeation, supports this view. That is, the nylon may locate itself at the places where the polyethylene would exhibit permeability, and acts as a barrier. In particular, it is to be noted that a mixture of 50 parts by weight of a 50%-crystalline polyethylene became essentially impermeable with 50 parts by weight of nylon; while only 20 parts by weight of nylon gave very low permeability with a 70%-crystalline polyethylene, that is, one with 30% non-crystalline components (see Table I): and a phase of this invention is the production of mixtures in which the percentage of nylon employed is closely the same as the percentage of the non-crystalline polyethylene.

This proportionation of the nylon to and coaction with the non-crystallization component does not, however, appear to constitute the sole criterion in procuring low permeability and other behavior. Thus intermolecular grafting, produced by relative shearing flow at the high pressure, may produce composite molecules effective as blending agents for the normally incompatible components, and thus provide a product of the great resistance to permeation and delamination, and of competence of accepting printing inks in a manner denied by the high percentage of polyethylene present.

This disclosure includes the employment of lesser quantities of nylon than the equivalent in weight percent of the non-crystalline component of the polyhydrocarbon. Thus, in many cases of commercial use, a reduction of the permeability by a specific liquid only is necessary or a reduction to, say, half the permeability value. It has been found that significant reduction of permeability occurs at lesser amounts of the nylon component. Thus, an amount of 5 weight percent of nylon effects a significant reduction in the amount of organic solvent passed.

Furthermore, addition of 5 weight percent of nylon effects a surface change in the mixture, so that it can be printed under conditions where the pure polyhydrocarbon does not accept an adherent coating.

In practice, the mixture of nylon and polyethylene, or other hydrocarbon resin, is heated to above the melting point of the nylon component, and subjected to kneading with turbulent relative shifting of the components while under a pressure in excess of 500 p.s.i., with pressures up to machine endurance, e.g. 4500 p.s.i., having been employed.

The illustrative examples are not restrictive, and the invention can be practiced in other ways within the scope of the appended claims.

What is claimed is:

1. The process of preparing an organic plastic composition which is resistant to permeation of fluids, which comprises kneading together a water-insoluble fiber-forming synthetic linear polymeric carbonamide which contains recurring carbonamide groups as integral parts of the main polymer chain separated by at least two carbon atoms, and molten hydrocarbon polymer selected from the group consisting of polyethylene and polypropylene, under a pressure of at least 500 pounds per square inch, the polycarbonamide being present as at least 5 percent by weight of the combined polymers, and the hydrocarbon polymer as at least 5 percent by weight of the combined polymers.

2. The process of claim 1, in which the pressure during kneading is at least 1800 pounds per square inch.

3. The process of claim 2, in which the hydrocarbon polymer is polyethylene.

4. The process of claim 1, in which the kneaded material is extruded as a film.

5. The process of claim 1, in which the kneaded material is extruded as a filament.

6. The process of claim 1, in which the kneaded material is extruded and formed into a bottle.

7. The process of preparing an organic plastic composition which is resistant to permeation of fluids, which comprises kneading together a water-insoluble fiber-forming synthetic linear polymeric carbonamide which contains recurring carbonamide groups as integral parts of the main polymer chain separated by at least two carbon atoms, and molten hydrocarbon polymer selected from the group consisting of polyethylene and polypropylene, under a pressure of at least 500 pounds per square inch, the polycarbonamide being present as 10 to 80 percent by weight of the combined polymers, and the hydrocarbon polymer being 90 to 20 percent by weight of the combined polymers.

8. The process of preparing an organic plastic composition which is resistant to permeation of fluids, which comprises kneading together a water-insoluble fiber-forming synthetic linear polymeric carbonamide which contains recurring carbonamide groups as integral parts of the main polymer chain separated by at least two carbon atoms, and molten hydrocarbon polymer selected from the group consisting of polyethylene and polypropylene, under a pressure of at least 500 pounds per square inch, the hydrocarbon polymer having a crystallinity of 50 to 85 percent and being present as at least 50 percent by weight of the combined polymers, and the percentage by weight of the polycarbonamide being at least equal to the percentage by weight of the hydrocarbon polymer which is not crystalline.

9. The composition produced by the process of claim 1.

10. As an article of manufacture, a film essentially impermeable to hexane and made from the composition produced by the process of claim 1.

11. As an article of manufacture, a filament made from the composition produced by the process of claim 1.

12. As an article of manufacture, a bottle made from the composition produced by the process of claim 1.

13. As an article of manufacture, a bottle having a body made from the composition produced by the process of claim 1, and having an adherent coating of a vinylidene chloride polymer resistant to the penetration of oxygen.

14. The composition made by the process of claim 8.

15. As an article of manufacture, a laminate material consisting of a body layer of paper, and adherent thereto a layer of the composition produced by the process of claim 4.

References Cited in the file of this patent

UNITED STATES PATENTS

| | | |
|---|---|---|
| 2,302,332 | Leekley | Nov. 17, 1942 |
| 2,550,650 | Arnold | Apr. 24, 1951 |
| 2,906,123 | Vernet et al. | Sept. 29, 1959 |

OTHER REFERENCES

Hahn et al.: "Polythene Physical and Chemical Properties," Industrial and Engineering Chemistry, volume 37, No. 6, June 1945, pages 526 to 533.